(12) United States Patent
Hiben et al.

(10) Patent No.: US 9,648,584 B2
(45) Date of Patent: May 9, 2017

(54) SINGLE FREQUENCY NETWORK BROADCAST FOR MISSION-CRITICAL SERVICES ON LTE

(71) Applicant: MOTOROLA SOLUTIONS, INC, Schaumburg, IL (US)

(72) Inventors: Bradley M. Hiben, Glen Ellyn, IL (US); Henry W. Anderson, Itasca, IL (US); Jeff S. Anderson, Bloomingdale, IL (US); Peter Drozt, Prairie Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1 day.

(21) Appl. No.: 14/068,680

(22) Filed: Oct. 31, 2013

(65) Prior Publication Data

US 2015/0117323 A1 Apr. 30, 2015

(51) Int. Cl.
*H04W 72/00* (2009.01)
*H04W 4/06* (2009.01)
(Continued)

(52) U.S. Cl.
CPC ......... *H04W 72/005* (2013.01); *H04L 12/189* (2013.01); *H04W 4/06* (2013.01); *H04W 16/02* (2013.01)

(58) Field of Classification Search
CPC ........... H04W 4/00; H04W 4/02; H04W 4/06; H04W 64/00; H04W 72/00; H04W 16/02;
(Continued)

(56) References Cited

U.S. PATENT DOCUMENTS 6,405,048 B1 * 6/2002 Haartsen ............... H04W 48/10
455/448
8,031,745 B2 10/2011 Onggosanusi
(Continued)

FOREIGN PATENT DOCUMENTS

WO 2008058149 A2 5/2008
WO 2013070918 A1 5/2013

OTHER PUBLICATIONS

Corresponding International Application No. PCT/US2014/061318—International Search Report with Written Opinion mailed Feb. 2, 2015.
(Continued)

*Primary Examiner* — Michael Thier
*Assistant Examiner* — Eric Nowlin
(74) *Attorney, Agent, or Firm* — Barbara R. Doutre; Larry Baratta

(57) ABSTRACT

A method for transmitting data in a single-frequency network in a Long Term Evolution (LTE) network includes receiving media for broadcast in a broadcast area of a plurality of broadcast areas associated with a single-frequency network, wherein the broadcast area comprises a plurality of cells; identifying a subset of defined broadcast resources for broadcasting the media to the broadcast area; broadcasting the media to the broadcast area using the subset of defined broadcast resources; and broadcasting a null pattern on the subset of defined broadcast resources in adjacent broadcast areas to the broadcast area. An associated LTE network and broadcast controller are also described.

23 Claims, 11 Drawing Sheets

(51) Int. Cl.
*H04W 16/02* (2009.01)
*H04L 12/18* (2006.01)

(58) Field of Classification Search
CPC ... H04W 24/10; H04W 28/16; H04W 52/244; H04W 72/005; H04W 72/0453; H04L 5/0073; H04B 7/0617; H04B 17/327
See application file for complete search history.

(56) References Cited

U.S. PATENT DOCUMENTS

| | | | |
|---|---|---|---|
| 8,355,742 B2 | 1/2013 | Gorokhov | |
| 8,401,575 B2 | 3/2013 | Fischer | |
| 9,204,344 B2* | 12/2015 | Wang | H04J 13/0074 |
| 9,549,382 B2* | 1/2017 | Dinan | H04W 52/60 |
| 2008/0089312 A1* | 4/2008 | Malladi | H04L 5/005 370/345 |
| 2009/0245197 A1* | 10/2009 | Ma | H04L 5/0046 370/330 |
| 2010/0103950 A1* | 4/2010 | Statelov | H04N 21/234327 370/468 |
| 2010/0105366 A1* | 4/2010 | Zhao | H04W 72/005 455/414.1 |
| 2010/0172311 A1* | 7/2010 | Agrawal | H04L 5/0048 370/329 |
| 2010/0195582 A1* | 8/2010 | Koskinen | H04L 5/0032 370/329 |
| 2010/0220651 A1* | 9/2010 | Chen | H04L 5/0007 370/328 |
| 2010/0278132 A1* | 11/2010 | Palanki | H04B 1/7107 370/329 |
| 2011/0149829 A1 | 6/2011 | Terry | |
| 2011/0164547 A1 | 7/2011 | Kim et al. | |
| 2011/0205951 A1* | 8/2011 | Lee | H04W 4/18 370/312 |
| 2011/0286349 A1* | 11/2011 | Tee et al. | 370/252 |
| 2012/0287838 A1 | 11/2012 | Zhang | |
| 2012/0329400 A1* | 12/2012 | Seo | H04J 11/005 455/63.1 |
| 2013/0077586 A1 | 3/2013 | Damnjanovic | |
| 2013/0107785 A1* | 5/2013 | Bhattad | H04J 11/005 370/312 |
| 2013/0142103 A1 | 6/2013 | Tenny | |
| 2013/0223400 A1* | 8/2013 | Seo | H04J 11/005 370/329 |
| 2013/0279361 A1* | 10/2013 | Seo | H04J 11/0053 370/252 |
| 2014/0112254 A1* | 4/2014 | Lindoff | H04W 74/002 370/328 |
| 2014/0341057 A1* | 11/2014 | Seo | H04W 24/10 370/252 |
| 2015/0036494 A1* | 2/2015 | Kotecha et al. | 370/235 |
| 2015/0036524 A1* | 2/2015 | Kim | H04W 24/10 370/252 |
| 2015/0109986 A1* | 4/2015 | Siomina | H04L 1/1854 370/312 |
| 2015/0139134 A1* | 5/2015 | Dinan | H04W 52/346 370/329 |
| 2015/0327202 A1* | 11/2015 | Xu | H04W 56/0015 370/280 |
| 2015/0373725 A1* | 12/2015 | Oh | H04W 72/082 370/280 |
| 2016/0021565 A1* | 1/2016 | Kim | H04L 5/005 370/329 |
| 2016/0182178 A1* | 6/2016 | Aguirre | H04W 72/005 370/312 |

OTHER PUBLICATIONS

Ericsson—"SFGN Area Configuration for E-MBMS"—3rd Generation Partnership Project (3GPP); Technical Specification Group (TSG); Radio Access Network (RAN); Working Group 3 (WG3), vol. R3-061505. No. 7.3.4.—Oct. 2006.

* cited by examiner

SINGLE FREQUENCY NETWORK BROADCAST FOR MISSION-CRITICAL SERVICES ON LTE

BACKGROUND OF THE INVENTION

The present disclosure relates to wireless networking such as Long Term Evolution (LTE) networks. There is a need to provide mission-critical performance for certain services over LTE, such as, for example, in public safety applications. While LTE provides guaranteed bit rate unicast services, LTE does not provide mission-critical performance on the downlink for one-to-many services because there is no limit on the number of users that may need to receive a copy of the one-to-many service. The only way to guarantee a constant bit rate for all users on the downlink is to use broadcast. LTE provides a broadcast service called multimedia broadcast single frequency network (MBSFN) which is a communication channel in LTE which sends the same content information to all users in a cell (broadcast) or to a given set of users (subscribers) in a cell (multicast) using a subset of the available radio resources with the remaining available to support transmissions towards a particular user (so-called unicast services). MBSFN is a transmission mode which exploits LTE's Orthogonal frequency-division multiplexing (OFDM) radio interface to send multicast or broadcast data as a multicell transmission over a synchronized single-frequency network (SFN). This group of cells is called a "broadcast area". The transmissions from the multiple cells in the broadcast area are sufficiently tightly synchronized for each to arrive at the UE within the OFDM Cyclic Prefix (CP) so as to avoid Inter-Symbol Interference (ISI). In effect, this makes the MBSFN transmission appear to user equipment (UE) as a transmission from a single large cell, dramatically increasing the Signal-to-Interference Ratio (SIR) due to the absence of inter-cell interference.

However, interference at the edge of a broadcast area can limit the bit rate that can be supported. Not only that, but since broadcast is used, the bit rate is limited for the entire broadcast area. Disadvantageously, a low modulation/coding selection has to be used to provide mission-critical reliability and the associated bit rate supported may be too low to provide enough channels. For example, in a public safety LTE system for a large police department, e.g. the NYPD, the bit rate supported would be too low to provide enough voice channels. Accordingly, there is a need for single-frequency network broadcast for mission-critical service on LTE.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
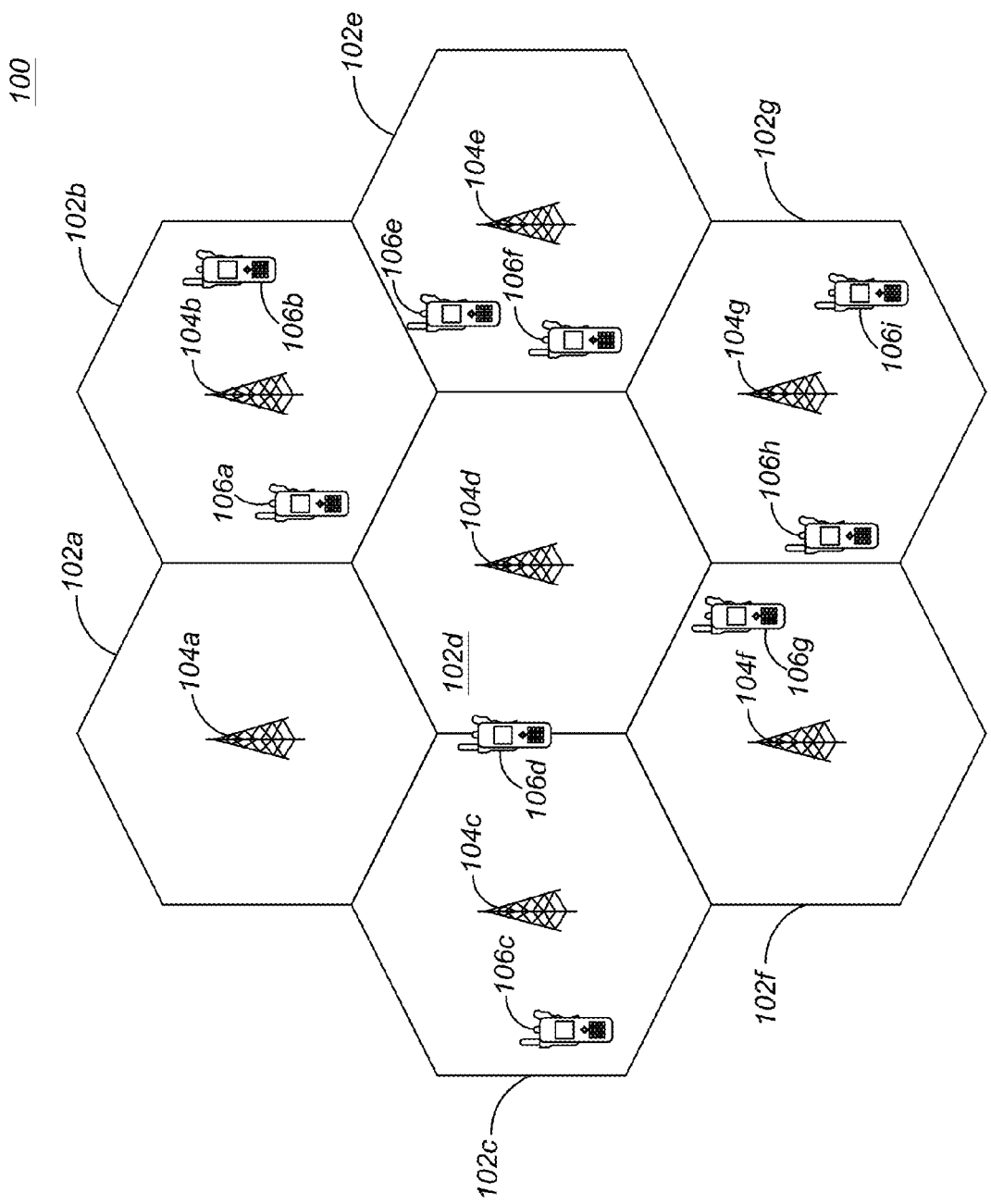
FIG. 1 is a network diagram of an exemplary LTE system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for transmitting data in a single-frequency network in a Long Term Evolution (LTE) network includes receiving media for broadcast in a broadcast area of a plurality of broadcast areas associated with a single-frequency network, wherein the broadcast area comprises a plurality of cells; identifying a subset of defined resources for broadcasting the media to the broadcast area; broadcasting the media to the broadcast area using the subset of defined resources; and broadcasting a null pattern on the subset of defined resources in adjacent broadcast areas to the broadcast area.

In another exemplary embodiment, a broadcast controller in a Long Term Evolution (LTE) network includes a plurality of multiplexers each communicatively coupled to a cell of a broadcast area of a plurality of broadcast areas associated with a single-frequency network; wherein the broadcast controller is configured to: receive media for broadcast in the broadcast area, wherein the broadcast area comprises a plurality of contiguous cells; identify a subset of defined resources for broadcasting the media to the broadcast area; broadcast the media to the broadcast area using the subset of defined resources; and broadcast a null pattern on the subset of defined resources in adjacent broadcast areas to the broadcast area In yet another exemplary embodiment, a Long Term Evolution (LTE) network includes a plurality of broadcast areas comprising a first broadcast area and a second one or more adjacent broadcast areas; a broadcast controller communicatively coupled to the plurality of broadcast areas; wherein the first broadcast area and the broadcast controller are configured to: receive media for broadcast in the first broadcast area, wherein the first broadcast area comprises a plurality of cells; identify a subset of defined resources for broadcasting the media to the first broadcast area; broadcast the media to the first broadcast area using the subset of defined resources; and broadcast a null pattern on the subset of defined resources in the second one or more adjacent broadcast areas.

In various exemplary embodiments, single-frequency network broadcast systems and methods use LTE's MBSFN (multimedia broadcast single frequency network) mode, which is basically a "simulcast" system, to provide a broadcast service for one-to-many media streams, most predominately, voice. The single-frequency network broadcast systems and methods may utilize a reuse pattern such as those used in cellular telephony systems such as Advanced Mobile Phone System (AMPS) and Global System for Mobile Communications (GSM). In an exemplary embodiment, the single-frequency network reuse broadcast systems and methods use a three-broadcast area reuse pattern (also referred to herein as a 3:1 reuse pattern), as described in greater detail below, as it has been found to provide sufficient reliability of a sufficiently high signal-to-interference-plus-noise ratio (SINR). Note, the broadcast area reuse pattern as described herein is being done at the broadcast area level, not at a cell/sector eNB/cell level, and frequencies (in the traditional sense) are not being partitioned.

FIG. 1 is a network diagram of an exemplary LTE system 100 in accordance with some embodiments. As shown in FIG. 1, the LTE system 100 provides communication for multiple cells 102, such as, for example, macros cells 102a-102g, with each cell being serviced by a corresponding access point (AP), such as, for example, APs 104a-104g. Each of the APs 104 can include multiple antenna groups with each antenna group and/or the area in which they are designed to communicate is often referred to as a sector of the AP 104. In the aspect, antenna groups each are designed to communicate to access terminals in a sector, of the areas covered by access point 104. The APs 104 can be referred to as base stations or evolved Node B's (eNodeB or eNB). The AP 104 can be a fixed station used for communicating with various access terminals (ATs) 106, such as, for example, ATs 106a-106i. The ATs 106 can also be called a user terminal, user equipment (UE), a wireless communication device, mobile station, terminal or the like. Again, each of the cells 102 can be further divided into one or more sectors. The ATs 106a-106i are dispersed throughout the LTE system 100. Each AT 106 can communicate with one or more APs 104 on a forward link (FL) and/or a reverse link (RL) at a given moment, depending upon whether the AT 106 is active and whether it is in soft handoff, for example. The LTE system 100 can provide service over a large geographic region, while the cells 102 cover a smaller geographic region relative thereto. Adjacent cells 102 or sectors that broadcast the same media in the same frequency resources at the same time are together called a "broadcast area". Note, the broadcast area can be an MBSFN area, but does not have to be. For example, a broadcast area could be a portion of an MBSFN area, etc.

Figure 2:
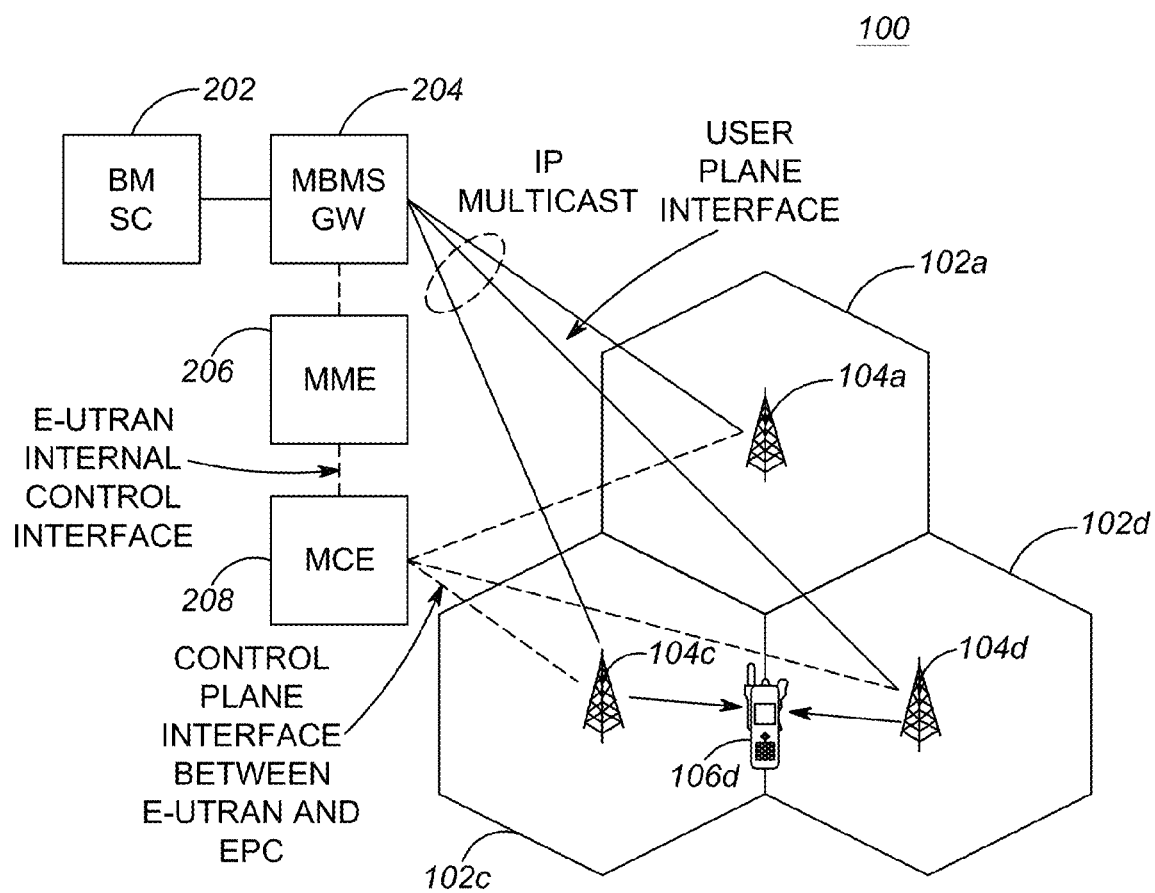
FIG. 2 is a network diagram of a portion of the LTE network of FIG. 1 illustrating Evolved Multicast Broadcast Multimedia Services (E-MBMS) in accordance with some embodiments.

FIG. 2 is a network diagram of a portion of the LTE network 100 illustrating Evolved Multicast Broadcast Multimedia Services (E-MBMS) in accordance with some embodiments. Here, the LTE network 100 includes Broadcast/Multicast Service Center (BM SC) 202, a Multicast Broadcast Multimedia Services gateway (MBMS GW) 204, a Mobile Management Entity (MME) 206, and a Multi-cell/Multicast Coordination Entity (MCE) 208. The BM SC 202 is connected to the MBMS GW 204 and provides authentication, an interface to a content provider, and overall configuration of a data flow through the LTE network 100. The MBMS GW 204 is a logical node handling the multicast of packets from the BM SC 202 to the ATs 106 as well as handling session control via the MME 206. The MME 206 handles all tasks that are not related to the air interface. The MCE 208 is a key element for E-MBMS to coordinate the use of the same resources and transmission parameters across the same cells 102 and/or sectors belonging to an MBSFN area.

In MBSFN, in the LTE system 100 for example, transmission happens from a time-synchronized set of APs 104 using a same resource block. This enables over-the-air combining, thus improving the Signal-to-Interference plus Noise-Ratio (SINR) significantly compared to non-SFN operation. The Cyclic Prefix (CP) used for MBSFN is slightly longer, and this enables the ATs 106 to combine transmissions from different APs 104. There is a SYNC protocol between the MBMS GW 204 and the APs 104 to ensure that the same content is sent over-the-air from all the APs 104. The BM SC 202 is the source of the MBMS traffic, and the MBMS GW 204 is responsible for distributing the traffic to the different APs 104 of the broadcast area. IP multicast may be used for distributing the traffic from the MBMS GW 204 to the different APs 104. The MCE 208 is a defined control plane entity that ensures that the same resource block is allocated for a given service across all the APs 104 of a given broadcast area. It is the task of the MCE to ensure that the RLC/MAC layers at the APs 104 are appropriately configured for MBSFN operation.

In FIG. 2, the LTE network 100 includes the AT 106d for illustration purposes communicatively coupled to the AP 104c and the AP 104d. MBSFN is a point-to-multipoint mode of transmission where the APs 104 can transmit the same data to multiple ATs 106 simultaneously. In FIG. 2, for example and in some cases, multiple APs, such as the APs 104c and 104d, can transmit the same data simultaneously so the AT 106d can receive the same data from both the APs 104c and 104d. The LTE system 100 uses a separate channel for MBSFN which uses a control plane interface from the MCE 208 to the APs 104 (depicted in FIG. 2 as between an Evolved Packet Core (EPC) and a Radio Access Network (E-UTRAN) of an LTE network) for control information and a user plane interface from the MBMS GW 204 to the APs 104 for data transmission.

Again, in various exemplary embodiments, the LTE system 100 utilizes the MBSFN mode to provide a broadcast service for one-to-many media streams to the ATs 106. The LTE system 100 includes a reuse pattern that uses all the spectrum but only part of the time. In an exemplary embodiment, the cellular reuse broadcast systems and methods use a three-broadcast area reuse pattern as it has been found to provide sufficient reliability of a sufficiently high signal-to-interference-plus-noise ratio (SINR), but larger reuse patterns are also possible and are sometimes necessary.

The cellular reuse broadcast systems and methods include mapping talk groups to geographic areas, and additionally, mapping broadcast areas to geographic areas. Then the media for each talk group that falls within a broadcast area is routed to the ATs 106 in that broadcast area. The reuse pattern is implemented by using a subset of LTE's resource blocks, either in time or in frequency or both. The cellular reuse broadcast systems and methods include two mapping techniques, namely (1) mapping broadcast areas as the same as talk group areas, and (2) mapping substantially uniformly shaped broadcast areas over a coverage area without regard for the geographic areas covered by the various talk groups.

Figure 3:
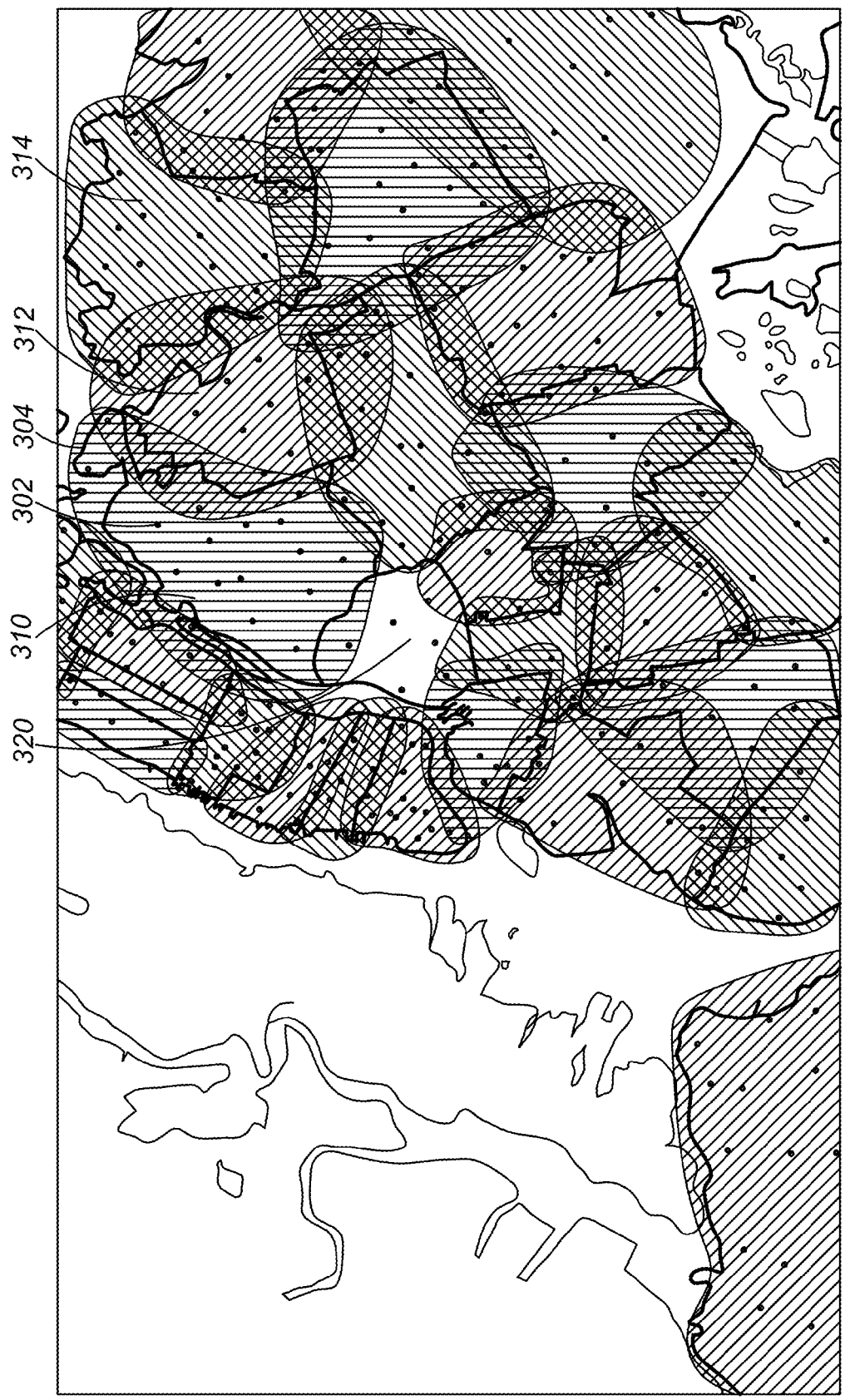
FIG. 3 is a map of New York City illustrating LTE coverage utilizing a first mapping technique of mapping broadcast areas as the same as talk group areas in accordance with some embodiments.

FIG. 3 is a map of New York City illustrating LTE coverage utilizing the first mapping technique of mapping broadcast areas as the same as talk group areas in accordance with some embodiments. FIG. 3 generally shows New York City with LTE eNB sites 302 indicated by dots. NYPD's patrol zones 304 are indicated by the heavier lines, which are areas that are covered by a particular talk group or group of talk groups. In this first mapping technique, the broadcast areas are mapped to arbitrarily shaped cells which correspond to the talk group areas, and the mapping utilizes a three-broadcast area pattern for reuse. Broadcast areas 310, 312, 314 are indicated by shading which has been laid out such that the same reuse pattern never touches itself geographically. Note, each broadcast area 310, 312, 314 includes one or more cells 302 that are in a defined talk group area. The advantage of this approach is that media is sent exactly where it is needed and not where it is not, so it is more efficient than the second mapping method. However, it is not always possible to map an area to a three-broadcast area pattern of arbitrarily shaped broadcast areas. In the case of FIG. 3, there is one broadcast area 320 that does not fit and will need its own time slot or frequency.

Figure 4:
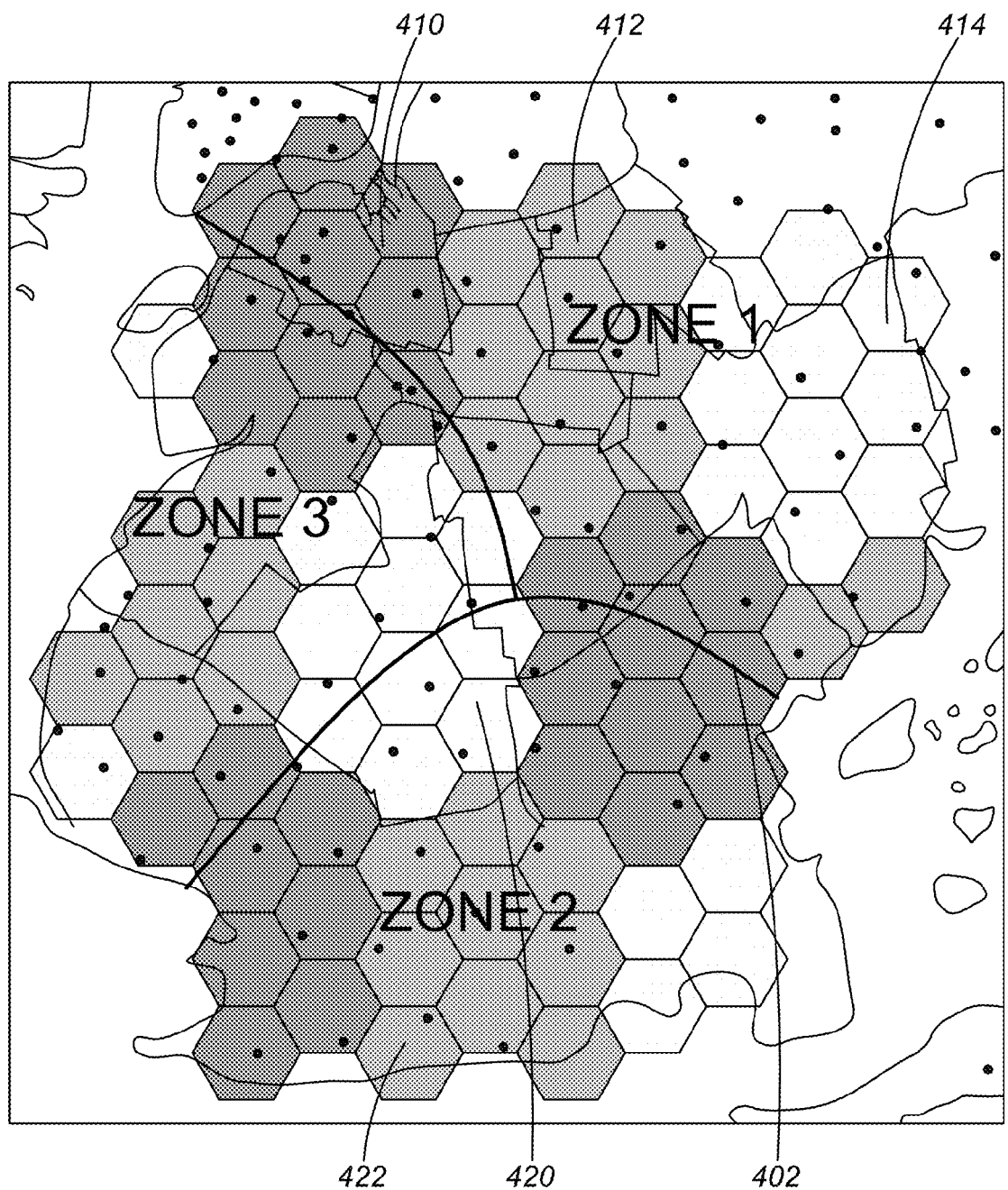
FIG. 4 is a another map of New York City illustrating LTE coverage utilizing a second mapping technique mapping broadcast areas over a coverage area in accordance with some embodiments.

FIG. 4 is a another map of New York City illustrating LTE coverage utilizing the second mapping technique mapping substantially uniformly or variably shaped broadcast areas over a coverage area in accordance with some embodiments. Again, the second mapping technique includes mapping substantially uniformly or variably shaped broadcast areas over a coverage area without regard for the geographic areas covered by the various talk groups. Again, FIG. 4 is the same geography as FIG. 3, i.e. NYC, with the reuse pattern mapped to broadcast areas 410, 412, 414 (depicted as shaded areas in FIG. 4, wherein each area of a different shading is a different broadcast area) as uniformly or variably shaped (except at the shore line or other geographic barriers) and laid out over the coverage area without regard for the geographic areas covered by the various talk groups. Instead, the talk groups are mapped to broadcast areas that cover areas used by the talk groups through zones 1, 2, 3. The zone barriers 402 are shown by the heavy lines in FIG. 4. The second mapping technique results in better SINR because the broadcast areas have uniform separation. Also, the second mapping technique requires additional media to be transmitted in the broadcast areas such as broadcast area 420 shown where three zones of media must be transmitted. Specifically, the broadcast area 420 lies in each of the zones 1, 2, 3 and requires media for each, while a broadcast area 422 lies entirely in zone 2 and only requires media for zone 2.

Figure 5:
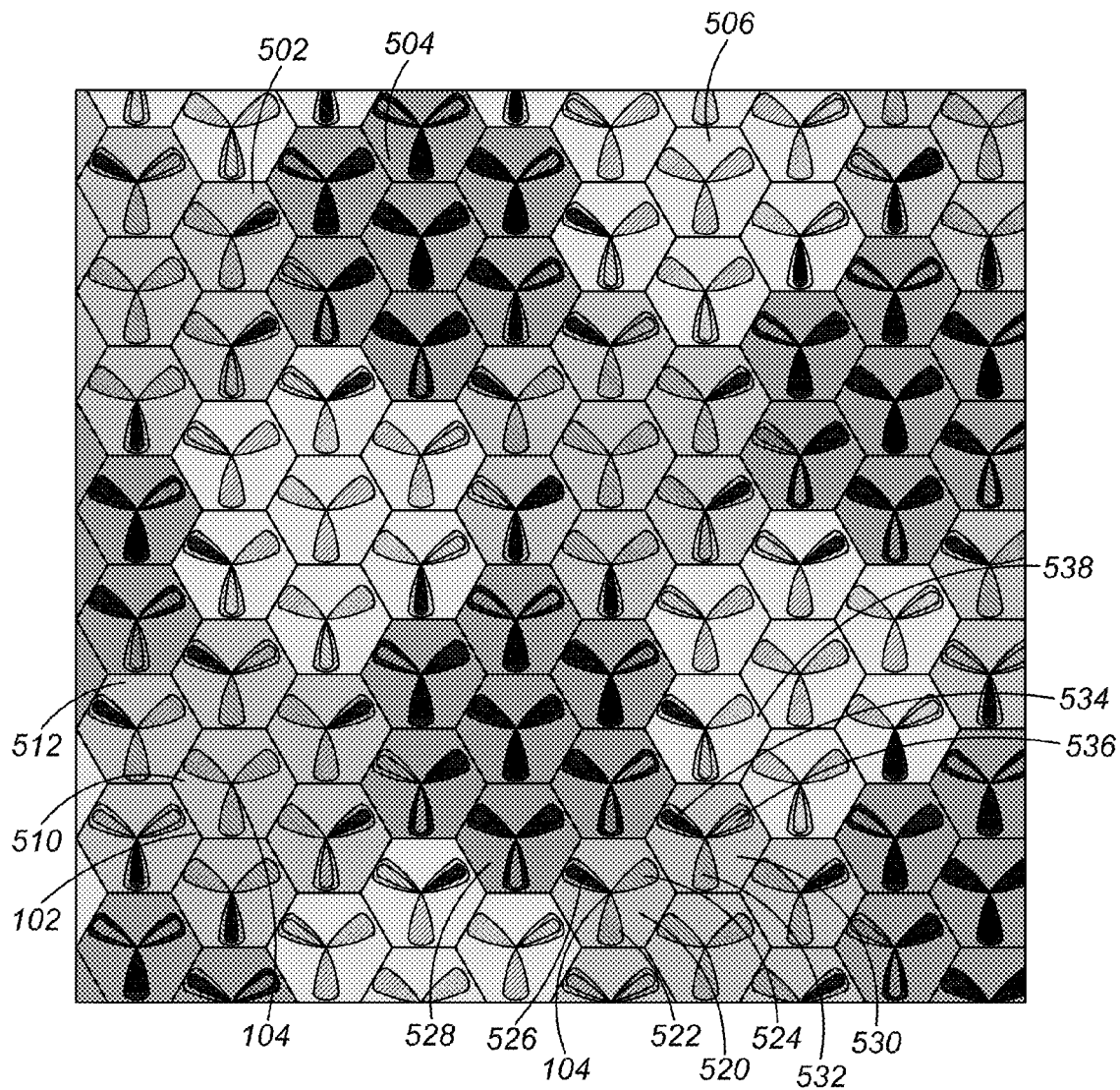
FIG. 5 is a network diagram of an LTE system utilizing the second mapping technique with an assist ring around the peripheries of each broadcast area in accordance with some embodiments.

In the example of FIG. 4, each broadcast area 410, 412, 414 includes ten cells 102 (the hexagonal shaped regions) except for the areas including a shore line or another geographic barrier. Other numbers of cells 102 per broadcast area are also contemplated, such as seven cells 102 per broadcast area as illustrated in FIG. 5. Importantly, the broadcast areas 410, 412, 414 are substantially uniformly shaped in such a manner that a three-broadcast area reuse pattern is possible. By being substantially uniformly shaped with the three-broadcast area reuse pattern, there can be an equal number of cells. Of course, other shapes, number of cells in the reuse pattern, and number of cells are also contemplated. The three broadcast area reuse pattern refers to the distribution of broadcast resources among the broadcast areas, e.g., among broadcast areas 402, 410, 412, 414, 420, and 422, and more particularly means that a same resource may be allocated (for internal use within the broadcast area) only to every third broadcast area. Thus, with reference to FIG. 4, a three broadcast area reuse pattern means that the broadcast areas without shading (e.g., broadcast areas 414 and 420) is allocated a first set of broadcast resources for internal use, a broadcast area with light gray shading (e.g., broadcast areas 412 and 422) is allocated a second set of broadcast for internal use that is different from the first set of broadcast resources, and a broadcast area with dark gray shading (e.g., broadcast areas 402 and 410) is allocated a third set of broadcast resources for internal use that is different from the first and second sets of broadcast resources. Further, as depicted in FIG. 4, no broadcast area is adjacent to another broadcast area allocated a same set of broadcast resources for internal use, i.e., a same set of time and frequency resource blocks. For example, a first broadcast area, e.g., broadcast area 420, is surrounded by multiple adjacent broadcast areas, e.g., broadcast areas 402, 410, 412, and 422, that are each reserved a set of broadcast resources different from the set of broadcast resources allocated to broadcast area 420.

Further, since no adjacent broadcast areas are allocated, for internal use, a same set of broadcast resources, there is no interference from adjacent broadcast areas based thereon. In addition, edge cells of a broadcast area, that is, a cell of a first broadcast area, associated with a first MBSFN, that is adjacent to a cell of a second, adjacent broadcast area, associated with a second MBSFN, also may be allocated the set of broadcast resources allocated to the second broadcast area/MBSFN for the purpose of transmitting media of the second MBSFN into the second broadcast area. For example, an edge cell of the broadcast area 410 that is adjacent to a cell of the broadcast area 412 may be allocated the set of broadcast resources allocated to the broadcast area 412 for the purpose of broadcasting, by the edge cell of the broadcast area 410, media into the broadcast area 412. Thus, signal reception in the broadcast area 412 may be improved at the edges of the broadcast area.

In addition, FIG. 4 depicts multiple zones (three shown—Zone 1, Zone 2, and Zone 3). Each zone corresponds to a talk group, i.e., a first talk group associated with Zone 1, a second talk group associated with Zone 2, and a third talk group associated with Zone 3. As is apparent in FIG. 4, some broadcast areas are contained entirely within a single zone, e.g., the broadcast area 422, and some broadcast areas overlap multiple zones, e.g., the broadcast areas 402, 410, 412, and 422 overlap two zones and broadcast area 420 overlaps three zones. Since broadcast areas may need to transmit data for one or more zones, the cellular reuse broadcast systems and methods propose utilizing time division multiplexing for its frequency reuse as is described herein. That is, when a broadcast area overlaps multiple zones, that broadcast area will transmit media for all zones, or talk groups, that it covers. For example, the broadcast area 420 will transmit media for all three zones, as some cells of broadcast area 420 are located in, and will transmit media for Zone 2, other cells of broadcast area 420 are located in, and will transmit media for Zone 3, and yet other cells of broadcast area 420 are located in, and will transmit media for multiple zones, such as Zones 1 and 3, Zones 2 and 3, and one cell that overlaps Zones 1, 2, and 3 and will transmit media for all three zones.

FIG. 5 is a network diagram of an LTE system 500 utilizing the second mapping technique with an assist ring around the peripheries of each broadcast area 502, 504, 506 in accordance with some embodiments. The LTE system 500 utilizes the second mapping technique which includes substantially uniformly shaped broadcast areas 502, 504, 506 (again, wherein a broadcast area is depicted as commonly shaded area and wherein each area of a different shading is a different broadcast area) utilizing a three-broadcast area reuse pattern. Note, the broadcast areas 502, 504, 506 each utilizes seven cells 102 and also conforms to the three-broadcast area reuse pattern described in FIG. 4, but this is not to be construed as a limitation as other numbers of cells can be used. Again, each cell 102 includes an AP 104, i.e., an eNB. The cells 102 in each broadcast area 502, 504, 506 can be either interior cells 510 (i.e., cells adjacent only to cells of the same broadcast area) or exterior cells 512 (i.e., cells adjacent to a cell of an adjacent broadcast area). Note, in the seven cell configuration of FIG. 5, there is one interior cell 510 per broadcast area, whereas in the ten cell configuration of FIG. 4, there are two interior cells 510 per broadcast area. Conversely, the exterior cells 512 are both adjacent to the interior cells 510 and to exterior cells 512 from other broadcast areas.

Each of the APs 104 in all of the cells 102, 510, 512 includes a three-directional broadcast pattern referred to as "sectors." The media is varied on the APs 104 as follows. For the interior cells 510, the media broadcast by the cell is solely the media associated with the broadcast area. For the exterior cells 512, the media broadcast by the cell is a combination of media associated with the broadcast area and media associated with the adjacent broadcast areas. For example, in an exemplary edge, or exterior, cell 520 having sectors 522, 524, and 526, the AP 104 serving that cell broadcasts, using directional antennas, an antenna pattern such that a separate beam is broadcast in each of sectors 522, 524, 526. In sectors 522 and 524, the AP broadcasts media associated with the broadcast area of the cell only, as these sectors are adjacent to other cells which are part of the same broadcast area. In sector 526, which is adjacent to a cell 528 of a different broadcast area, the AP 104 serving cell 520 broadcasts media associated with the broadcast area of cell 520 and broadcasts media associated with the adjacent broadcast area that includes cell 528.

By way of further example, in another exemplary cell 530, the AP 104 serving the cell 530 also has a three direction antenna pattern defining sectors 532, 534, 536. Note that the cell 530 is adjacent to two broadcast areas, i.e., to the broadcast area that includes cell 528 and to the broadcast area that includes cell 538. Thus, the AP 104 serving cell 530 will broadcast media associated with the broadcast area of cell 530, media associated with the adjacent broadcast area of cell 528, and media associated with the adjacent broadcast area that includes cell 538. For example, sector 534 of cell 530 is adjacent to the broadcast areas of cells 528 and 538, and therefore will broadcast media associated with both adjacent broadcast areas as well as media of the broadcast area that includes cell 530. On the other hand, sector 532 of cell 530 is adjacent only to cells of the same broadcast area as cell 530, and therefore the AP 104 serving cell 530 broadcasts, in sector 532, only media associated with that broadcast area.

The sectors 526, 534, 536 are referred to as an 'assist ring' around the adjacent broadcast areas. An assist ring can be used to impart extra power into such an adjacent broadcast area, and this has been found to improve reliability. Generally, all sectors in all of the cells 102 transmit the media of the associated broadcast area. The assist ring includes neighboring cells 102 of adjacent broadcast areas that transmit the media into the broadcast area. This reinforces, or assists, the signal in each broadcast area. Adding more signal can also cause interference so it is important that only sectors that improve SINR are used in the assist ring and part of the analysis done here was to evaluate which sectors helped and which hurt.

Figure 6A:
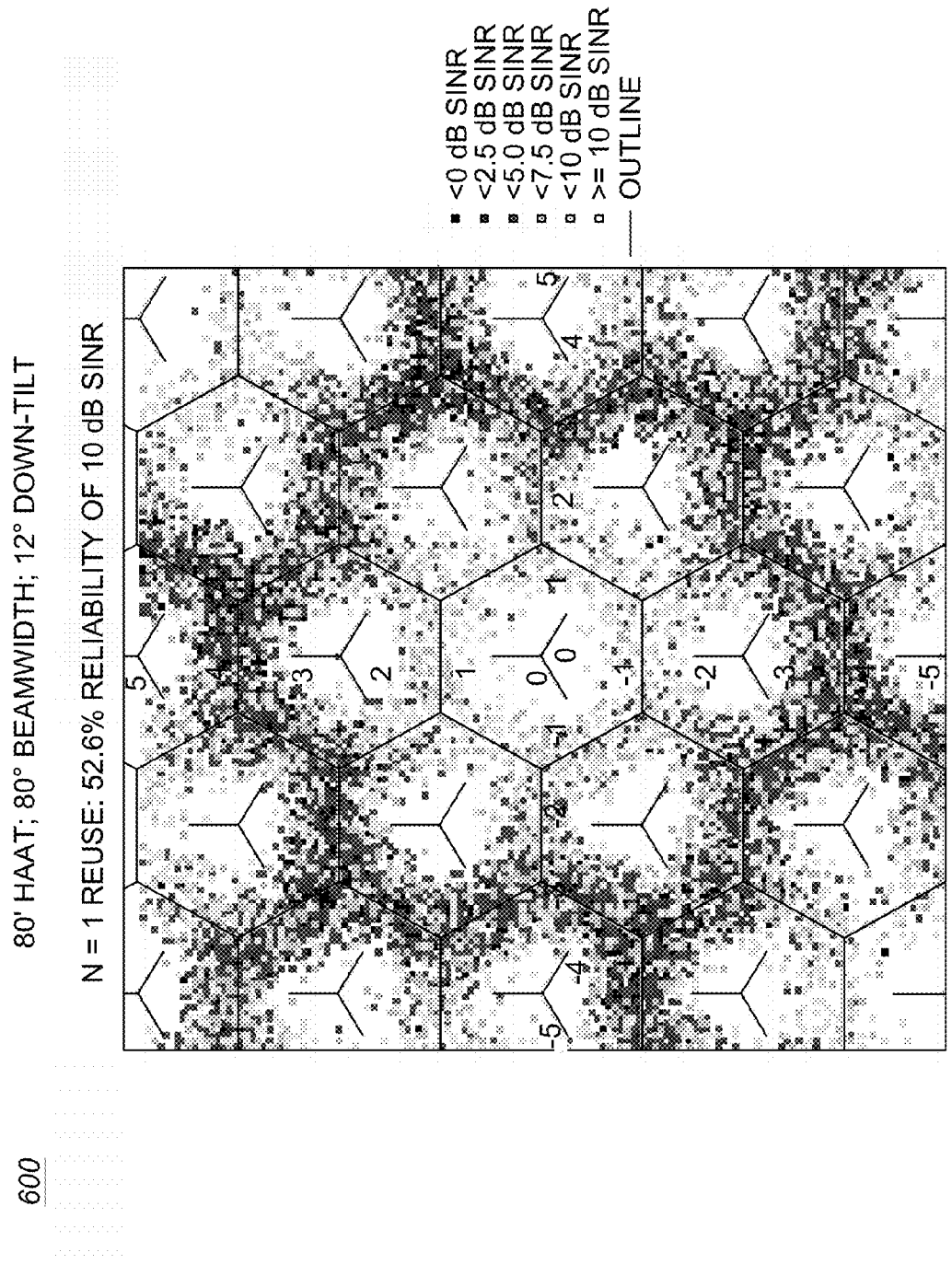
FIGS. 6A, 6B, and 6C are heat maps of various scenarios of reuse and with the assist ring scenario in the LTE system of FIG. 5 in accordance with some embodiments.
Figure 6B:
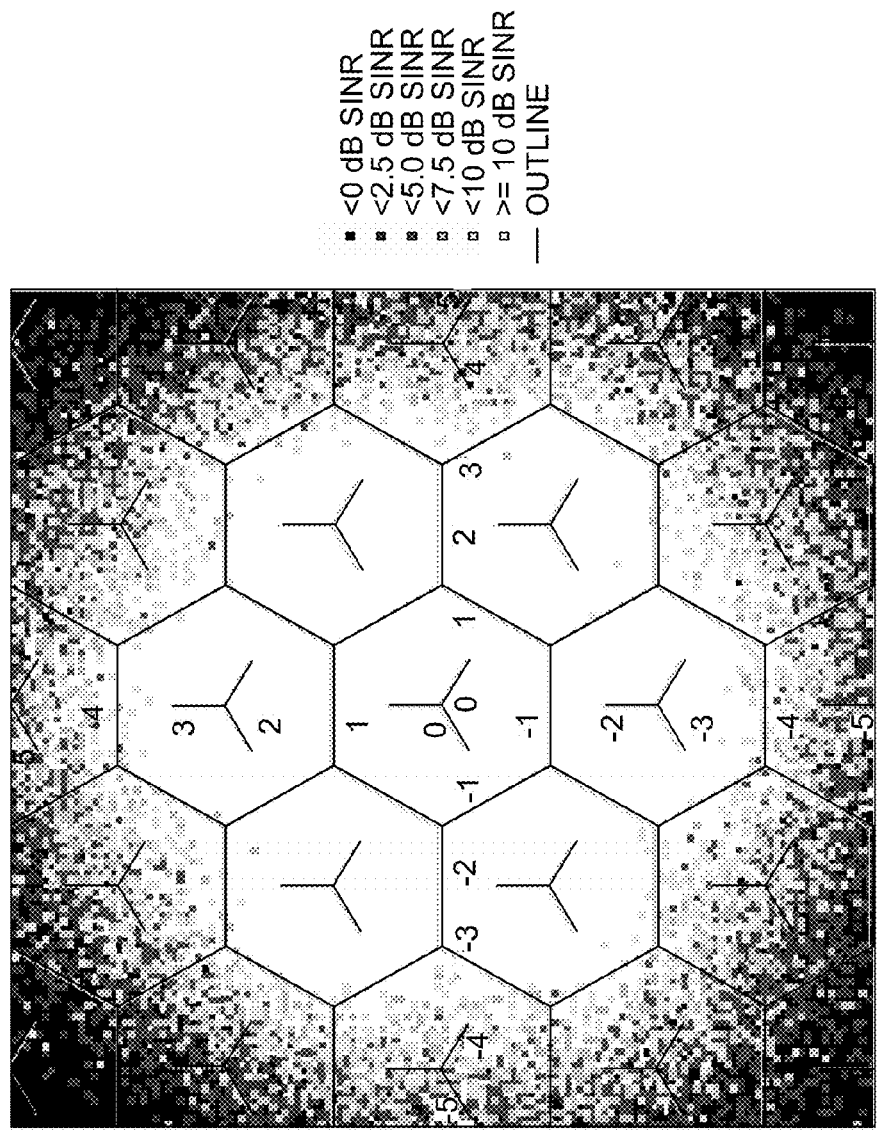
Figure 6C:
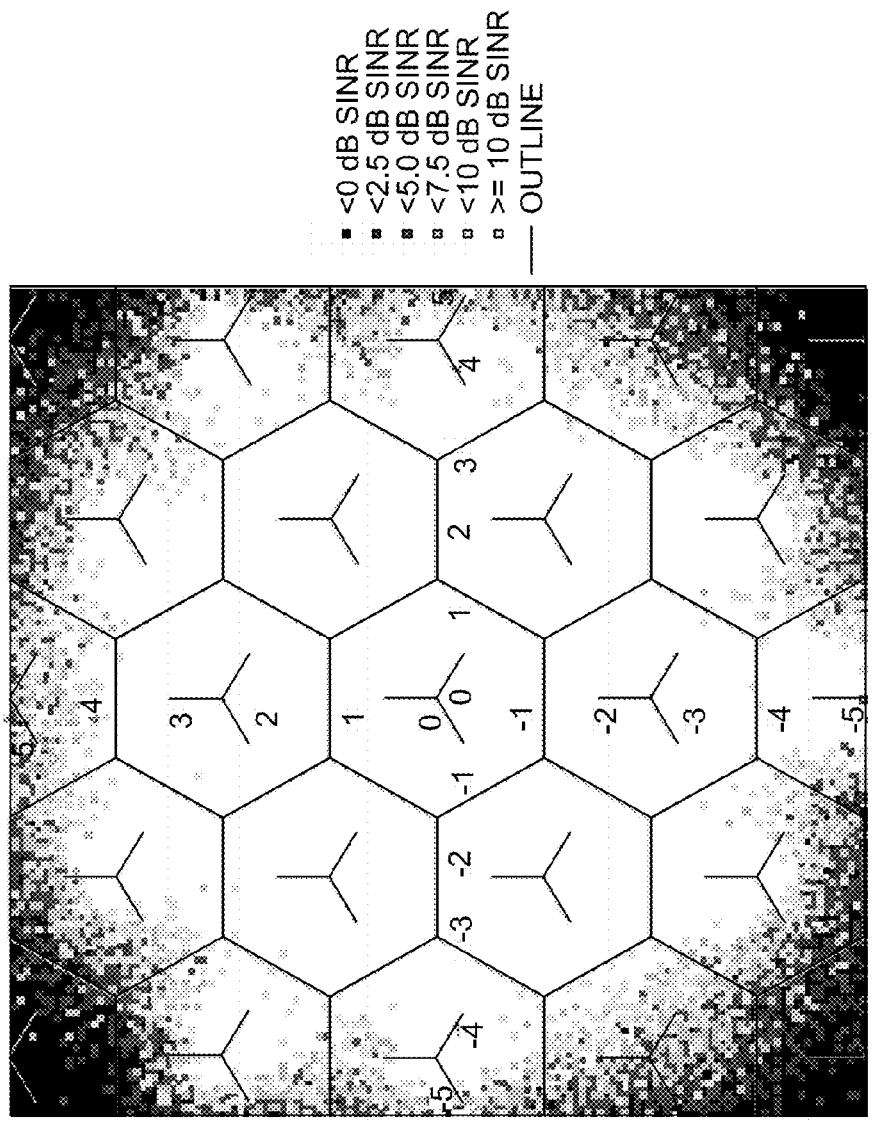

FIGS. 6A, 6B, and 6C depict heat maps of various scenarios of reuse and with the assist ring scenario in the LTE system 500 in accordance with some embodiments. Specifically, FIGS. 6A, 6B, and 6C include three heat maps 600, 602, and 604, respectively. A first heat map 600 includes no reuse, a second heat map 602 includes the 3:1 reuse pattern described herein, and a third heat map 604 includes the 3:1 reuse pattern described herein with an assist ring. Each of the heat maps 600, 602, 604 shows the impact on wireless coverage of the associated scenarios. Use of a three broadcast area reuse pattern reduces the capacity of each broadcast area by a factor of three, since it only transmits one-third of the time, but the SINR available, at 98.5% reliability, is better by more than 10 dB than the SINR (and associated reliability) typical of a no reuse pattern, which more than makes up for the reduced throughput of the three broadcast area reuse pattern. The addition of the assist ring improves reliability further. Improving reliability by 1% may appear insignificant, but in this case it actually improves coverage from 98.5% to 99.5% which would otherwise require approximately 3.75 dB of additional link margin which is equivalent to adding 30% more sites.

Figure 7:
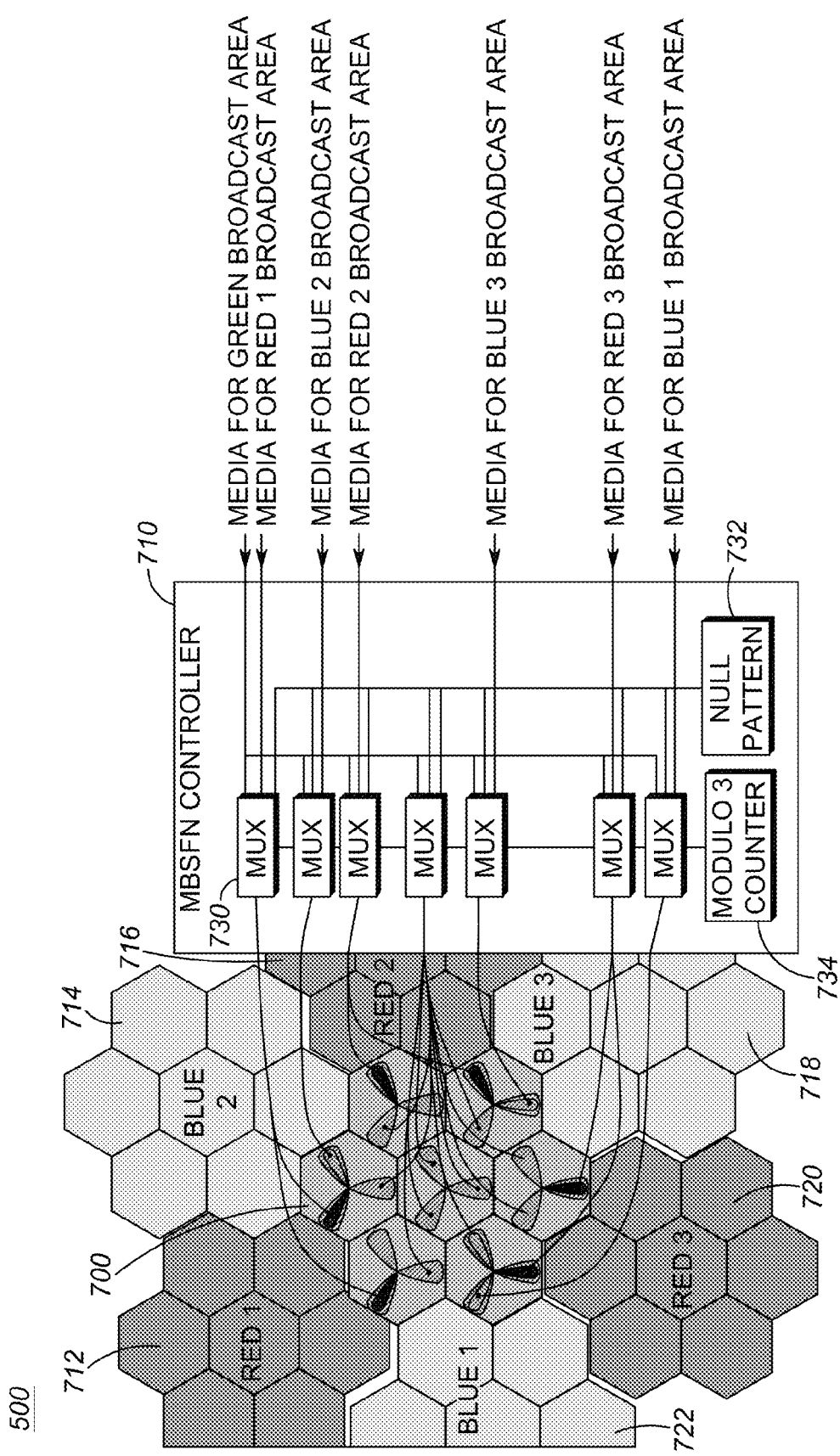
FIG. 7 is network diagram of a portion of the LTE system of FIG. 5 highlighting one broadcast area coupled to an MBSFN controller in accordance with some embodiments.

FIG. 7 is network diagram of a portion of the LTE system 500, highlighting one broadcast area 700 coupled to an MBSFN controller 710 in accordance with some embodiments. The MBSFN controller 710 can be the MBMS GW 204, and functionally is configured to map media to the broadcast area. The 3:1 reuse pattern means that three sets of media are combined via the multiplexers 730 in the MBSFN controller 710. The cellular reuse broadcast systems and methods include additional functionality on the MBMS GW 204 to apply the 3:1 reuse pattern. Further, the assist ring functionality adds additional functionality beyond the 3:1 reuse pattern because the mapping of media to broadcast area becomes dynamic, requiring switching functionality as shown in FIG. 7.

Specifically, the MBSFN controller 710 is illustrated in FIG. 7 with the additional functionality required for the 3:1 reuse pattern and the assist ring. Other functions associated with the MBSFN controller 710 or the MBMS GW 204 are omitted for simplicity. FIG. 7 illustrates the one broadcast area 700, which for illustration purposes can be denoted as a "green" broadcast area. Based on the aforementioned description, the broadcast area 700 is only adjacent to non-green broadcast areas, which can be referred to as "red" and "blue" broadcast areas for illustration purposes. For example, FIG. 7 includes the central broadcast area 700, denoted as green; surrounded by a broadcast area 712, denoted as a red 1; a broadcast area 714, denoted as blue 2; a broadcast area 716, denoted as red 2; a broadcast area 718, denoted as blue 3; a broadcast area 720, denoted as red 3; and a broadcast area 722, denoted as blue 1.

The MBSFN controller 710 includes a multiplexer 730 for each sector in each of the cells 102 of the broadcast area 700. Each multiplexer 730 is coupled to media for the green broadcast area and a null pattern 732, since each antenna pattern direction in the broadcast area 700 will at least transmit media associated with the green broadcast media. The null pattern 732 is used where there is nothing to transmit in the 3:1 reuse pattern. Some of the multiplexers 730 are also coupled to media for the red 1, 2, 3 or blue 1, 2, 3 broadcast areas as well. Each multiplexer 730 is further coupled to a modulo counter 734 which runs from zero to two to account for the N=3 reuse pattern. Media or a null pattern (sending nothing) are multiplexed to each sector on each phase of the reuse pattern. The MBSFN controller 710 further includes a processor (not shown), such as one or more microprocessors, microcontrollers, digital signal processors (DSPs), combinations thereof or such other devices known to those having ordinary skill in the art. The particular operations/functions of the processor, and thus of the MBSFN controller, is determined by an execution of software instructions and routines that are stored in a respective at least one memory device (not shown) associated with the processor, such as random access memory (RAM), dynamic random access memory (DRAM), and/or read only memory (ROM) or equivalents thereof, that store data and programs that may be executed by the corresponding processor and that allows the MBSFN controller to perform all functions necessary to operate as described herein.

The MBSFN controller 710 can be referred to as a broadcast controller in an LTE network. The broadcast controller can be configured to: receive media for broadcast in the broadcast area, wherein the broadcast area comprises a plurality of cells; identify a subset of defined broadcast resources for broadcasting the media to the broadcast area; broadcast the media to the broadcast area using the subset of defined broadcast resources; and broadcast a null pattern on the subset of defined broadcast resources in adjacent broadcast areas to the broadcast area.

As described in FIG. 5, the antenna pattern directions for the interior cells and for the exterior cells of the green broadcast area that face other green broadcast cells (i.e., for sectors of green broadcast area cells that are adjacent to other green broadcast cells), the associated multiplexers 730 are coupled to the green media and the null pattern. Here, these antenna pattern directions will transmit the green media for one phase, and the null patterns for two phases in the 3:1 reuse pattern. In sectors of the exterior cells of the green broadcast area that is, sectors that are adjacent to blue or red broadcast areas, the sector, that is, the antenna pattern in the direction toward the adjacent broadcast area, will transmit the green media for one phase, either the red 1, 2, 3 or blue 1, 2, 3 media for another phase (whichever is appropriate for the adjacent broadcast area), and the null pattern for the third phase. This approach provides high SINR at a high coverage reliability by breaking the coverage area into broadcast areas and mapping media to those areas. In particular, the assist ring maps the media in a dynamic way. Further, this approach eliminates the need to map the broadcast areas to the talk group areas as described in the first mapping technique.

Figure 8:
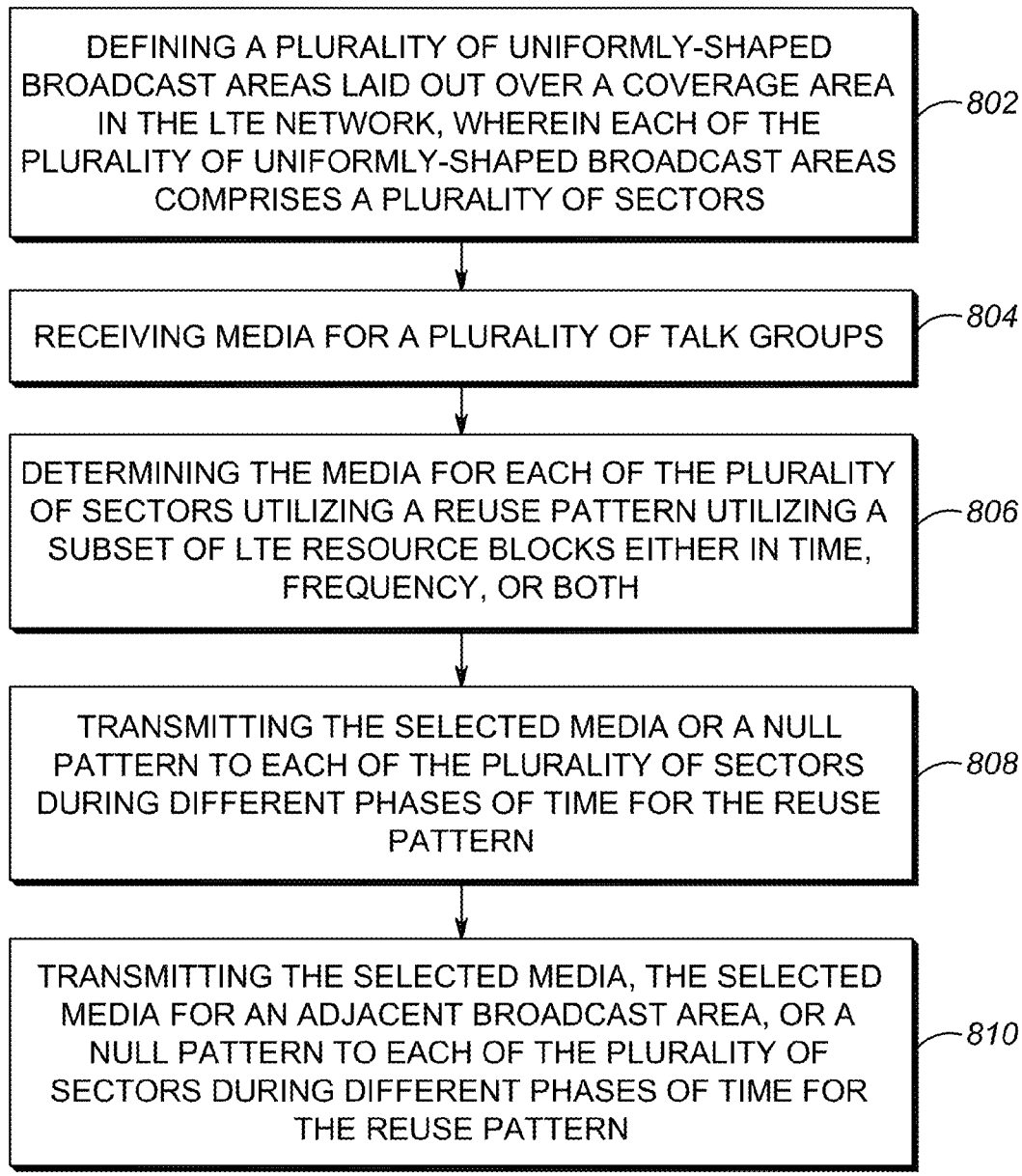
FIG. 8 is a flowchart of a method for cellular reuse in an LTE network utilizing MBSFN areas in accordance with some embodiments.

FIG. 8 is a flowchart of a method 800 for cellular reuse in an LTE network utilizing MBSFN to create broadcast areas in accordance with some embodiments. The method 800 contemplates operation in the LTE systems 100, 500 and the like. The method 800 includes defining a plurality of uniformly-shaped broadcast areas laid out over a coverage area in the LTE network, wherein each of the plurality of uniformly-shaped broadcast areas comprises a plurality of sectors (step 802). The method 800 further includes receiving media for a plurality of talk groups (804). Note, the plurality of uniformly-shaped broadcast areas are laid out over the coverage area in the LTE network without regard to geographic areas covered by the plurality of talk groups. Accordingly, the method 800 includes determining the media for each of the plurality of sectors utilizing a reuse pattern utilizing a subset of LTE resource blocks either in time, frequency, or both (step 806).

The method 800 can include transmitting the selected media or a null pattern to each of the plurality of sectors during different phases of time for the reuse pattern (step 808). The null pattern is designed to transmit the minimum amount of power necessary to keep the ATs 106 synchronized with the system. This may require the transmission of only synchronization symbols, or may require channel-sounding pilot symbols in addition to synchronization symbols, or perhaps require no transmission at all depending on the design of the ATs. Any power transmitted in the null pattern is interference to adjacent broadcast areas, which is why it is desirable to minimize the number of symbols transmitted which, in turn, minimizes the interference power transmitted. Optionally, the method 800 can include transmitting the selected media, the selected media for an adjacent broadcast area, or a null pattern to each of the plurality of sectors during different phases of time for the reuse pattern (step 810). The steps 808 and 810 assume a time domain reuse pattern, such as, for example, a three-broadcast area reuse pattern. The step 808 can be performed by all sectors in a broadcast area assuming the assist ring functionality described herein is not enabled. If the assist ring functionality is utilized, the step 808 can be performed by interior sectors of a broadcast area, and the step 810 can be performed by exterior sectors, i.e., sectors which are directly adjacent to another broadcast area. The selected media for the adjacent broadcast area is transmitted by a sector outside the adjacent broadcast area and facing the adjacent broadcast area to impart extra power into the adjacent broadcast area.

In the method 800, each of the plurality of substantially uniformly-shaped broadcast areas comprising a plurality of sectors, include 'N' eNBs each including 'M' sectors. The method 800 can further include, in each interior sector of the N eNBs for an broadcast area (i.e., an interior sector being adjacent only to cells of the same broadcast area), transmitting the selected media for the broadcast area or a null pattern during different phases of time for the reuse pattern; and, in each exterior sector of the N eNBs for the broadcast area (i.e., an exterior sector being adjacent to a cell of an adjacent broadcast area), transmitting the selected media for the broadcast area, the selected media for an adjacent broadcast area, or the null pattern during different phases of time for the reuse pattern.

The method 800 can be implemented in an LTE network utilizing broadcast areas and including a plurality of eNBs each comprising a plurality of sectors; a plurality of substantially uniformly-shaped Multimedia Broadcast Single Frequency Network (MBSFN) areas defined by the plurality of cells and laid out over a coverage area in the LTE network; and an MBSFN controller communicatively coupled to each of the plurality of sectors, the MBSFN controller configured to: receive media for a plurality of talk groups; and determine the media for each of the plurality of sectors utilizing a reuse pattern utilizing a subset of LTE resource blocks either in time, frequency, or both.

The method 800 can also be implemented in part or whole by an MBSFN controller in an LTE network including a plurality of multiplexers receiving media for one or more talk groups and a null pattern; each of the plurality of multiplexers transmitting during different phases of a reuse pattern to a sector in a cell contained in one of a plurality of substantially uniformly-shaped MBSFN areas laid out over a coverage area in the LTE network, wherein the reuse pattern utilizes a subset of LTE resource blocks either in time, frequency, or both.

Figure 9:
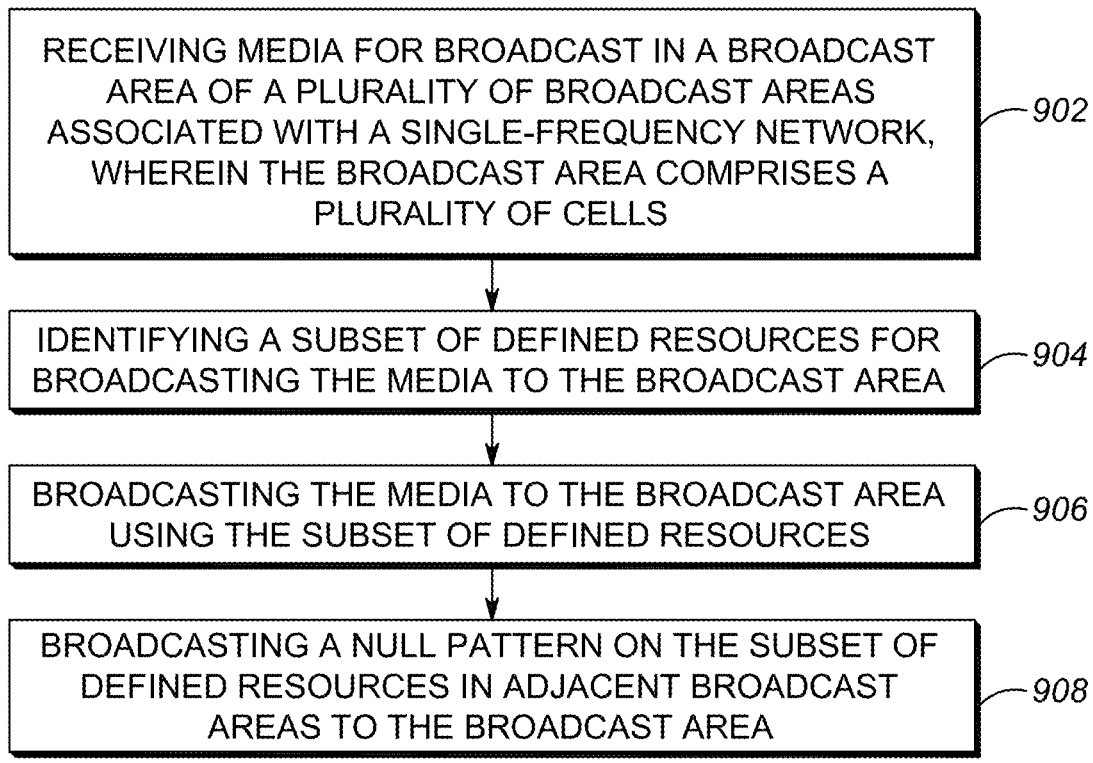
FIG. 9 is a flowchart of a method for transmitting data in a single-frequency network in an LTE network in accordance with some embodiments.

FIG. 9 is a flowchart of a method 900 for transmitting data in a single-frequency network in an LTE network in accordance with some embodiments. The method 900 contemplates operation in the LTE systems 100, 500 and the like. The method 900 focuses on a single broadcast area and the associated activity therein. The method 900 includes receiving media for broadcast in a broadcast area of a plurality of broadcast areas associated with a single-frequency network, wherein the broadcast area comprises a plurality of cells (step 902). The method 900 includes identifying a subset of defined broadcast resources for broadcasting the media to the broadcast area (step 904). The method 900 further includes broadcasting the media to the broadcast area using the subset of defined broadcast resources (step 906). Also, the method 900 includes broadcasting a null pattern on the subset of defined broadcast resources in adjacent broadcast areas to the broadcast area (step 908).

The method 900 can further include implementing a reuse pattern in the single-frequency network; and broadcasting the media for a portion of the reuse pattern in the broadcast area and broadcasting the null pattern for another portion of the reuse pattern. Optionally, the reuse pattern can include partitioning broadcast resources associated with the single-frequency network into three groups. The method 900 can further include receiving second media for broadcast in an adjacent broadcast area to the broadcast area; identifying a second subset of defined broadcast resources for broadcasting the second media; broadcasting the second media using the second subset of defined broadcast resources in cells of the plurality of cells that are adjacent to the adjacent broadcast area; and broadcasting a null pattern on the second subset of defined broadcast resources in the broadcast area. The second media is transmitted by the cells outside the adjacent broadcast area and facing the adjacent broadcast area to impart extra power into the adjacent broadcast area.

The method 900 can further include implementing a reuse pattern using three resource groups in time in the broadcast area; broadcasting the media for part of the reuse pattern in all of the cells; broadcasting media for the adjacent broadcast areas for part of the reuse pattern in adjacent cells to the adjacent broadcast areas; and broadcasting a null pattern for part of the reuse pattern in all of the cells. The plurality of broadcast areas can be laid out over a coverage area in the LTE network without regard to geographic areas for associated media. The broadcast area can include N evolved Node Bs with each evolved Node B comprising M cells. The method 900 can further include, in each interior evolved Node B of the N evolved Node Bs, broadcasting the media using the subset of defined resource blocks and broadcasting a null pattern for another subset of defined resource blocks; and, in each exterior evolved Node B of the N evolved Node Bs, broadcasting the media using the subset of defined resource blocks and broadcasting media for an adjacent broadcast area for the another subset of defined resource blocks.

The cellular reuse broadcast systems and methods can use time division multiplexing (TDM) to separate MBSFN areas instead of frequency multiplexing in a three cell reuse pattern. Accordingly, the cellular reuse broadcast systems and methods contemplate using many small MBSFN areas with TDM reuse to support services like talk groups where many groups with small geographic coverage is required. The cellular reuse broadcast systems and methods also contemplate using MBMS Service Areas to build up larger coverage areas. The cellular reuse broadcast systems and methods further contemplate using the TDM with a three cell reuse pattern to provide MBSFN assist ring coverage to enhance the reception at the edge of the each small MBSFN. Smaller MBSFN's have larger edge of area reception issues. The TDM with a three cell re-use pattern reduces interference into the MBSFN area from surrounding unicast or alternate MBSFN traffic.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transmitting data in a single-frequency network in a Long Term Evolution (LTE) network, the method comprising:
   receiving media for broadcast in a broadcast area of a plurality of broadcast areas associated with the single-frequency network, wherein the broadcast area comprises a plurality of cells;
   implementing a reuse pattern in the single-frequency network;
   identifying a subset of defined broadcast resources for broadcasting the media to the broadcast area;
   broadcasting the media for a portion of the reuse pattern to the broadcast area using the subset of defined broadcast resources; and
   broadcasting a null pattern for another portion of the reuse pattern on the subset of defined broadcast resources in adjacent broadcast areas to the broadcast area, wherein the null pattern comprises a transmission that does not include any media,
   receiving second media for broadcast in an adjacent broadcast area to the broadcast area, the second media being transmitted by cells outside the adjacent broadcast area and facing the adjacent broadcast area to impart extra power into the adjacent broadcast area;
   identifying a second subset of defined broadcast resources for broadcasting the second media;
   broadcasting the second media using the second subset of defined broadcast resources in cells of the plurality of cells that are adjacent to the adjacent broadcast area; and
   broadcasting the null pattern on the second subset of defined broadcast resources in the broadcast area.

2. The method of claim 1, wherein the reuse pattern comprises partitioning broadcast resources associated with the single-frequency network into three groups.

3. The method of claim 1, further comprising:
   implementing the reuse pattern using three resource groups in time in the broadcast area;
   broadcasting the media for part of the reuse pattern in all of the cells;
   broadcasting the media for the adjacent broadcast areas for part of the reuse pattern in adjacent cells to the adjacent broadcast areas; and
   broadcasting the null pattern for part of the reuse pattern in all of the cells.

4. The method of claim 1, wherein the plurality of broadcast areas are laid out over a coverage area in the LTE network without regard to geographic areas for associated media.

5. The method of claim 1, wherein the broadcast area comprises N evolved Node Bs with each evolved Node B comprising M sectors.

6. The method of claim 5, further comprising:
   in each interior evolved Node B of the N evolved Node Bs, broadcasting the media using a subset of defined resource blocks and broadcasting the null pattern for another subset of defined resource blocks; and
   in each exterior evolved Node B of the N evolved Node Bs, broadcasting the media using the subset of defined resource blocks and broadcasting media for an adjacent broadcast area for the another subset of defined resource blocks.

7. The method of claim 1, wherein receiving media for broadcast comprises receiving media for a talkgroup and wherein the method further comprises:
   identifying a broadcast area for the talkgroup.

8. The method of claim 1, further comprising:
   adding an assist ring outside of the broadcast area and within the adjacent broadcast areas to impart additional power.

9. The method of claim 1, wherein the reuse pattern is a 3:1 reuse pattern.

10. A broadcast controller in a Long Term Evolution (LTE) network, the broadcast controller comprising:
    a plurality of multiplexers each associated with a cell of a broadcast area of a plurality of broadcast areas associated with a single-frequency network;
    wherein the broadcast controller is configured to:
    receive media for broadcast in the broadcast area, wherein the broadcast area comprises a plurality of cells;
    implementing a reuse pattern in the single-frequency network;
    identify a subset of defined broadcast resources for broadcasting the media to the broadcast area;
    broadcast the media for a portion of the reuse pattern to the broadcast area using the subset of defined broadcast resources; and
    broadcast a null pattern for another portion of the reuse pattern on the subset of defined broadcast resources in adjacent broadcast areas to the broadcast area, wherein the null pattern comprises a transmission that does not include any media;
    receive second media for broadcast in an adjacent broadcast area to the broadcast area, wherein the second media is transmitted by the cells outside the adjacent broadcast area and facing the adjacent broadcast area to impart extra power into the adjacent broadcast area;
    identify a second subset of defined broadcast resources for broadcasting the second media;

broadcast the second media using the second subset of defined broadcast resources in cells of the plurality of cells that are adjacent to the adjacent broadcast area; and broadcast a null pattern on the second subset of defined broadcast resources in the broadcast area.

11. The broadcast controller of claim 10, wherein the reuse pattern comprises partitioning broadcast resources associated with the single-frequency network into three groups.

12. The broadcast controller of claim 10, wherein the broadcast controller is configured to:
implement the reuse pattern using three resource groups in time in the broadcast area;
broadcast the media for part of the reuse pattern in all of the cells;
broadcast the media for the adjacent broadcast areas for part of the reuse pattern in adjacent cells to the adjacent broadcast areas; and
broadcast the null pattern for part of the reuse pattern in all of the cells.

13. The broadcast controller of claim 10, wherein the plurality of broadcast areas are laid out over a coverage area in the LTE network without regard to geographic areas for associated media.

14. The broadcast controller of claim 10, wherein the broadcast area comprises N evolved Node Bs with each evolved Node B comprising M sectors.

15. The broadcast controller of claim 14, wherein the broadcast controller is configured to:
in each interior evolved Node B of the N evolved Node Bs, broadcast the media using a subset of defined resource blocks and broadcast the null pattern for another subset of defined resource blocks; and
in each exterior evolved Node B of the N evolved Node Bs, broadcast the media using the subset of defined resource blocks and broadcast media for an adjacent broadcast area for the another subset of defined resource blocks.

16. The broadcast controller of claim 10, wherein receiving media for broadcast comprises receiving media for a talkgroup and wherein the broadcast controller further is configured to:
identify a broadcast area for the talkgroup.

17. The broadcast controller of claim 10, further comprising:
adding an assist ring outside of the broadcast area and within the adjacent broadcast areas to impart additional power.

18. The broadcast controller of claim 10, wherein the reuse pattern is a 3:1 reuse pattern.

19. A method for transmitting data in a single-frequency network in a Long Term Evolution (LTE) network, the method comprising:
receiving media for broadcast in a broadcast area of a plurality of broadcast areas associated with a single-frequency network, wherein the broadcast area comprises a plurality of cells;
implementing a reuse pattern in the single-frequency network;
identifying a subset of defined broadcast resources for broadcasting the media to the broadcast area;
broadcasting the media for a portion of the reuse pattern to the broadcast area using the subset of defined broadcast resources;
broadcasting a null pattern for another portion of the reuse pattern on the subset of defined broadcast resources in adjacent broadcast areas to the broadcast area, wherein the null pattern comprises a transmission that does not include any media; and
wherein the plurality of broadcast areas comprise a three-broadcast area reuse pattern providing sufficiently high signal-to-interference-plus-noise ratio (SINR) at a broadcast area level, not at a cell/sector level, and without partitioning of frequencies.

20. A broadcast controller in a Long Term Evolution (LTE) network, the broadcast controller comprising:
a plurality of multiplexers each associated with a cell of a broadcast area of a plurality of broadcast areas associated with a single-frequency network;
wherein the broadcast controller is configured to:
receive media for broadcast in the broadcast area, wherein the broadcast area comprises a plurality of cells;
implementing a reuse pattern in the single-frequency network;
identify a subset of defined broadcast resources for broadcasting the media to the broadcast area;
broadcast the media for a portion of the reuse pattern to the broadcast area using the subset of defined broadcast resources;
broadcast a null pattern for another portion of the reuse pattern on the subset of defined broadcast resources in adjacent broadcast areas to the broadcast area, wherein the null pattern comprises a transmission that does not include any media; and
wherein the plurality of broadcast areas comprise a three-broadcast area reuse pattern providing sufficiently high signal-to-interference-plus-noise ratio (SINR) at a broadcast area level, not at a cell/sector level, and without partitioning of frequencies.

21. A Long Term Evolution (LTE) network, comprising:
a plurality of broadcast areas comprising a first broadcast area and a second one or more adjacent broadcast areas;
a broadcast controller for controlling the plurality of broadcast areas;
wherein the broadcast controller is configured to:
receive media for broadcasting in the first broadcast area, wherein the first broadcasting area comprises a plurality of broadcast cells;
implementing a reuse pattern in the single-frequency network;
identify a subset of defined broadcast resources for broadcasting the media to the first broadcast area;
broadcast the media for a portion of the reuse pattern to the first broadcast area using the subset of defined broadcast resources;
broadcast a null pattern for another portion of the reuse pattern on the subset of defined broadcast resources in the second one or more adjacent broadcast areas, wherein the null pattern comprises a transmission that does not include any media; and
wherein the plurality of broadcast areas comprise a three-broadcast area reuse pattern providing sufficiently high signal-to-interference-plus-noise ratio (SINR) at a broadcast area level, not at a cell/sector level, and without partitioning of frequencies.

22. The LTE network of claim 21, further comprising:
adding an assist ring outside of the broadcast area and within the adjacent broadcast areas to impart additional power.

23. The LTE network of claim 21, wherein the reuse pattern is a 3:1 reuse pattern.

* * * * *